Nov. 24, 1953

C. W. PUTNAM 2,660,539

METHOD FOR PRODUCING A FLUORESCENT SCREEN

Original Filed June 19, 1948

WITNESSES:
Robert C. Baird
W. C. Groome

INVENTOR
Charles W. Putnam.
BY
F. W. Lyle.
ATTORNEY

Patented Nov. 24, 1953

2,660,539

UNITED STATES PATENT OFFICE 2,660,539

METHOD FOR PRODUCING A FLUORESCENT SCREEN

Charles W. Putnam, Bloomfield, N. J., assignor to Westinghouse Electric Corporation, East Pittsburgh, Pa., a corporation of Pennsylvania Original application June 19, 1948, Serial No. 34,060. Divided and this application February 25, 1950, Serial No. 146,373

3 Claims. (Cl. 117—33.5)

My invention relates to radiation-emitting screens and, in particular, it relates to a process for making light-emitting screens which produce a visible replica of the intensity distribution in an X-ray field. One use for my invention is in electrical discharge tubes in which electron images corresponding to a light image generated on a fluorescent screen by X-rays are first produced, and then a second light image which is an intensified replica of the initial light image is produced by incidence of the electron image on a second fluorescent screen. This application is a division of my copending application Serial No. 34,060, filed June 19, 1948 for a Fluorescent Screen, which claims certain subject matter herein described.

One example of an electrical discharge device of this type is shown and claimed in Lloyd P. Hunter and Richard Longini Patent 2,555,545 for an Image Intensifier, issued June 5, 1951. In the device just mentioned, an electron image is produced which is a replica of an X-ray picture on a fluorescent screen; the electrons are then accelerated to high velocity and into incidence upon a screen comprising a cathode ray phosphor, and the light image produced on the latter is observed. In the electrical discharge tube just described, the photo-electric surface comprises materials such as cesium which are active chemically and have a vapor of a substantial pressure and which are likely to react chemically with the components in the fluorescent screen during processing. It is, accordingly, necessary to provide some protective coating for the fluorescent material which is capable of preventing this reaction.

One object of my invention is, accordingly, to provide a novel type of fluorescent screen in which the fluorescent material is provided with a coating which is substantially transparent to incident light and is capable of preventing chemical reaction between the phosphor of the screen and cesium vapor.

Another object of my invention is to provide a protective coating for the particles comprised in a fluorescent screen which shall prevent chemical reaction between them and vapors present in the space around them.

Still another object of my invention is to provide an improved form of fluorescent screen in which chemical reaction between the fluorescent materials and an adjacent layer of chemically active material is prevented.

A still more specific object of my invention is to provide a method of protecting zinc sulphide from chemical reaction with photo-electrically active materials.

A still further object of my invention is to provide a method of preventing chemical reaction between fluorescent zinc sulphide and the components of cesiated antimony located in a common container therewith.

Still another object of my invention is to provide a fluorescent screen which is much less difficult to outgas than are prior art screens in which the individual fine particles of fluorescent material are exposed to the atmosphere of an evacuated container, and which contains a minimum of adsorbed vapors likely to gradually exude into such atmosphere during operative life of the tube.

Other objects of my invention will become apparent upon reading the following description, taken in connection with the drawing, in which.

Figure 1:
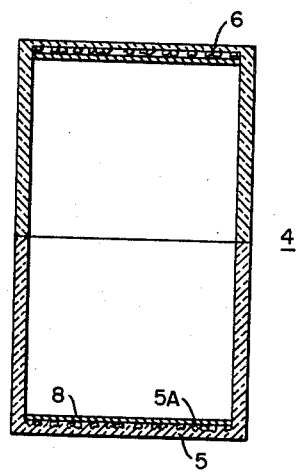
Figure 1 shows a view in longitudinal section of an electrical discharge tube containing a fluorescent screen protected in accordance with the principles of my invention.
Figure 2:
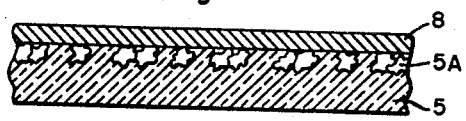
Fig. 2 is an enlarged view in section of the screen forming a wall portion of Fig. 1.
Figure 3:
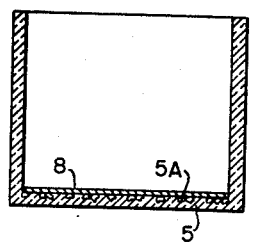
Fig. 3 is a longitudinal section of a container in which the plate 5 is placed at an intermediate point in the fabrication.

Referring in detail to the drawing, the fluorescent screen, in accordance with my invention, comprises a layer 5A made up of particles of a fluorescent material or phosphor, such, for example, as zinc sulphide or silver-activated zinc sulphide, which is embedded in glass plate 5 positioned within a container 4 of glass or other suitable material. The container 4 may be a vacuum-tight enclosure, such as the tube 4 in the above-mentioned Hunter and Longini application. As is illustrated in said application, the enclosure 4 may contain during the process of its manufacture a substantial pressure of the vapor of some photo-electric material, such, for example, as cesium used to produce a layer 8 of cesiated antimony deposited in close contiguity to the layer 5A. There is also located on another portion of the wall 6 of the container 4, a layer 9 of an electron phosphor such as zinc sulphide, which may be provided with chemical protection such as is described and claimed in Patent 2,586,304 of J. W. Coltman and R. L. Longini for Protection of Electron Phosphors. As has been stated above, there is a likelihood of chemical reaction between the fluorescent material of the layer 5A and photo-electric material just mentioned, and to prevent such undesired chemical reaction, the fluorescent layer 5A is embedded in the glass of the plate 5 by a procedure which will now be described.

Referring to the drawing, the final desired product is a glass plate 5 with a layer 5A of fluorescent material or phosphor sunk into the upper surface until all the phosphor particles are completely enclosed in the glass. The method of achieving this result is as follows:

A glass must be used for the plate 5 which will not be detrimental to the phosphor. The glass must not dissolve the phosphor, and it must not contain substances that will react with or unfavorably activate the phosphor. For example, the phosphor to be used may be a silver-activated zinc sulphide which fluoresces blue under excitation. This material as readily purchasable upon the market is notably subject to adverse activation by very minute quantities of impurities.

The glass for plate 5 is made up from chemicals containing impurities less than 0.001%. The glass contains the following components: $K_2O$, $ZnO$, $B_2O_3$. To give one instance, I have found a mix of 31 percent by weight of potassium oxide ($K_2O$) with 69 percent by weight of boric oxide ($B_2O_3$) to be a satisfactory one. However, I found mixes within the range of 0 to 40 percent $K_2O$, 0 to 60 percent $ZnO$ and 100 to 40 percent $B_2O_3$ to be satisfactory for many purposes. The constituents were fused in a platinum crucible at 1000° C. and poured into an aluminum mold. Besides their purity, these glasses are relatively low-melting, and the compositions mentioned above had a considerable range of thermal expansion coefficients.

The glass melt is evacuated in the molten state to remove all occluded gases, formed into a thin plate, annealed, and cooled. The layer 5A of fluorescent material is settled onto one surface of this plate from a solution containing a suitable binder.

Although a number of binders, such as borates, boro-phosphates or silicates of the alkali metals could probably be used, the one developed for this process has certain desirable features. The solution used was approximately 5% by weight potassium borate in water. The potassium borate was roughly of the formula: $K_2O.3B_2O_3$ or $KB_3O_5$ and very pure. When a thin layer of this solution is rapidly dried, it first forms an elastic film which on further drying becomes hard. Upon heating to fusion, this material forms a glass which will not divitrify under any heat treatment anticipated in this process, and it is a glass which is readily miscible with the glass used for the backing of the phosphor.

A homogeneous suspension of phosphor in the 5 percent potassium borate solution is placed in a container with the glass plate in the bottom. The amount of the phosphor mixture poured into the container will, of course, determine the thickness of the resulting layer. A layer which has a thickness when dried of 12 mils will be found suitable for many purposes.

The glass plate with superimposed phosphor layer is then baked at approximately 125° C. to dry the binder.

The glass plate is then placed, phosphor layer up, on a support of such a substance as graphite which, when the glass is heated to a softened condition, will maintain the glass shape, and will not stick to it. This support may have an integral heater, or it should be thin enough and of a material which will readily conduct heat. The glass and support are then placed in a container which can be evacuated. The chamber is closed and evacuated. The temperature is gradually raised while under vacuum to a point just below the softening point of the glass. The purpose of this treatment is to complete the removal of water from the binder and to outgas the phosphor and the surface of the glass. The vacuum is then broken, allowing the chamber to return to atmospheric pressure. The potassium borate binder protects the phosphor against oxidation. Zinc sulphide ordinarily oxidizes at 600° C. in air.

The temperature is then raised above the softening point of the glass (approximately 900° C.). This temperature is maintained while the molten glass diffuses up through the phosphor layer until the upper surface of the bonded unit is a continuous, though slightly irregular, glass surface. At this point the glass should be quickly reduced to annealing temperature, annealed and cooled.

The cesiated antimony layer may be applied to the surface of the finished plate by methods known in the art. Patent 2,456,968 of R. L. Longini for a Process for Outgassing Photocells Containing Antimony, issued December 21, 1948, shows one such method.

I claim as my invention:

1. The method of forming a fluorescent screen which comprises coating a supporting member consisting of a mixture of 0% to 40% potassium oxide, 0% to 60% zinc oxide and 100% to 40% boric oxide with a thin dry layer of zinc sulphide, heating said member until said zinc sulphide is completely submerged beneath the surface of said member, then cooling said member and thereafter applying a layer of cesiated antimony to the surface of said glass 2. The method of producing a fluorescent screen which comprises depositing on a glass supporting surface consisting essentially of 31% potassium oxide and 69% boric oxide a layer of zinc sulphide, heating said surface until said zinc sulphide is submerged in said glass, then cooling said surface and thereafter applying a layer of cesiated antimony to the surface of said glass.

3. The method of producing a fluorescent screen which comprises suspending particles of a zinc sulphide in an aqueous solution of potassium borate which covers a base plate of glass made up of 0% to 40% potassium oxide, 0% to 60% zinc oxide and 100% to 40% boric oxide, allowing particles to settle and form a layer on said base plate from said suspension, drying said plate, placing said plate in a container, evacuating the container, heating the plate to outgas said plate and layer, further heating said glass above its softening point until the particles of said layer are submerged in said glass, cooling said screen to room temperature, and thereafter applying a layer of cesiated antimony to the surface of said glass.

CHARLES W. PUTNAM.

References Cited in the file of this patent

UNITED STATES PATENTS

| Number | Name | Date |
|---|---|---|
| 1,848,567 | Kinzie | Mar. 8, 1932 |
| 2,077,481 | Huppert et al. | Apr. 20, 1937 |
| 2,123,939 | Germer | July 19, 1938 |
| 2,137,118 | Schleede et al. | Nov. 15, 1938 |
| 2,198,479 | Langmuir | Apr. 23, 1940 |
| 2,284,055 | Huniger et al. | May 26, 1942 |
| 2,298,968 | Roberts et al. | Oct. 13, 1942 |